(12) United States Patent
Lee et al.

(10) Patent No.: US 6,906,688 B2
(45) Date of Patent: Jun. 14, 2005

(54) SYSTEM AND METHOD FOR CONTROLLING HORIZONTAL SIZE OF MONITOR SCREEN

(75) Inventors: Jae-hoon Lee, Suwon (KR); Jae-hun Lee, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 233 days.

(21) Appl. No.: 10/266,111

(22) Filed: Oct. 7, 2002

(65) Prior Publication Data

US 2003/0160806 A1 Aug. 28, 2003

(30) Foreign Application Priority Data

Feb. 23, 2002 (KR) .......................................... 2002-9733

(51) Int. Cl.[7] .................................................. G09G 1/06
(52) U.S. Cl. .............................. 345/10; 345/11; 345/698
(58) Field of Search ................................ 345/10, 11, 12, 345/20, 22, 690, 698, 699, 211, 214; 315/411; 348/190, 806

(56) References Cited

U.S. PATENT DOCUMENTS

| | | | | |
|---|---|---|---|---|
| 5,216,504 A | * | 6/1993 | Webb et al. | 348/190 |
| 5,949,400 A | * | 9/1999 | Kim | 345/690 |
| 6,147,464 A | * | 11/2000 | Hsieh | 315/411 |
| 6,297,861 B1 | * | 10/2001 | Jo | 348/806 |

* cited by examiner

Primary Examiner—Xiao Wu
(74) Attorney, Agent, or Firm—F.Chau & Associates, LLC

(57) ABSTRACT

A system and method for controlling the horizontal size of a monitor screen are provided. The provided system for controlling the horizontal size of a monitor screen includes a processor, a driving circuit, and a microcomputer. Here, the processor generates a calibration signal to control the horizontal size of a monitor screen, in response to predetermined control signals. The driving circuit receives the calibration signal and controls the driving capacity of the calibration signal according to an external load to output the calibration signal. The microcomputer generates the control signals. It is preferable that the processor includes a first converter circuit for generating an alternating current (AC) control signal to control an AC element of the calibration signal in response to predetermined control signals, a second converter circuit for generating a first direct current (DC) control signal in response to the control signals, thereby controlling the DC element of the calibration signal, a third converter circuit for generating a second DC control signal to control a DC element of the calibration signal in response to the control signals, and a calibration signal generation circuit for generating the calibration signal in response to the AC, first DC and second DC control signals. Accordingly, the provided processor and system for controlling the horizontal size of the monitor screen control the horizontal size of the monitor screen without being affected by microcomputer generated noise.

15 Claims, 3 Drawing Sheets

PRIOR ART

SYSTEM AND METHOD FOR CONTROLLING HORIZONTAL SIZE OF MONITOR SCREEN

CROSS REFERENCE TO RELATED APPLICATION

This application claims priority to Korean Patent Application No. 02-9733 filed on Feb. 23, 2002, which is fully incorporated herein by reference.

BACKGROUND OF THE INVENTION

1. Field of the Invention

The present invention relates to a cathode ray tube (CRT) monitor, and more particularly, to a processor for controlling the horizontal size of a monitor screen and a system thereof.

2. Discussion of Related Art

The horizontal size of a screen of a CRT monitor is generally controlled by a direct current (DC) voltage of a horizontal calibration signal. In particular, the optimum horizontal size of the screen is determined at different DC voltages according to video modes of the monitor.

A conventional method for controlling the horizontal size of the monitor screen uses the DC voltage of the horizontal calibration signal, which is used for calibrating the geometry at left and right sides of the screen. In other words, an alternating current (AC) element of the horizontal calibration signal is used for calibrating the geometry of the screen, while the DC element of the horizontal calibration signal is used for controlling the horizontal size of the screen.

FIG. 1 illustrates a horizontal calibration signal. The horizontal calibration signal, having a parabolic shape, is for compensating a phenomenon in which an image on a screen is distorted by the magnetic field of the earth that bends the electron beam of a CRT. The AC element of the horizontal calibration signal (EWVAC) is used for calibrating the geometry of the screen, and the DC element of the horizontal calibration signal (EWVDC) is used for determining the horizontal size of the screen.

FIG. 2 is a block diagram illustrating a conventional system for controlling the horizontal size of the monitor screen. The conventional system for controlling the horizontal size of the monitor screen comprises a microcomputer 210, a processor 220, and a driving circuit 230. The processor 220 includes two converters 240 and 250, respectively. The converter 240 generates an AC control signal ACTRLS, while the other converter 250 generates a DC control signal DCTRLS. The control signals CTRLS generated from the microcomputer 210 control the amount of current of the AC and DC control signals ACTRLS and DCTRLS. In this case, a pulse width modulation (PWM) port (not shown) is allotted to the microcomputer 210, so that the PWM port generates a first calibration signal PWS for controlling the horizontal size of the screen.

A calibration signal generation circuit 260 in the processor 220 receives the DC and AC control signals DCTRLS and ACTRLS for generating a second calibration signal EWCRS. By summing up the first and second calibration signals PWS and EWCRS, a third calibration signal SUMS is formed, and the driving circuit 230 generates the horizontal calibration signal EWOUT in response to the third calibration signal SUMS.

When only one converter 250 is arranged in the processor 220 for controlling the horizontal size, the horizontal size of the monitor screen is generally controlled by additionally using the PWM port of the microcomputer 210. In other words, by arranging a plurality of components for controlling the horizontal size of the monitor screen, the converter 250 in the processor 220 is used for controlling the horizontal size, typically while the monitor is being manufactured in a factory. The PWM port of the microcomputer 210 is typically used by the user for controlling the horizontal size. If noise is present in the first calibration signal PWS generated from the PWM port of the microcomputer 210, the noise can propagate and affects the horizontal calibration signal EWOUT.

SUMMARY OF THE INVENTION

A processor for controlling the horizontal size of a monitor screen that is not affected by external noise and a system thereof is provided. An embodiment of the present invention provides a system for controlling the horizontal size of a monitor screen comprising a processor, a driving circuit, and a microcomputer. Here, the processor generates a calibration signal to control the horizontal size of a monitor screen, in response to predetermined control signals. The driving circuit receives a calibration signal, controls the driving capacity of the calibration signal according to an external load, and outputs the calibration signal. The microcomputer generates the control signals.

A preferred embodiment of the present invention includes: a first converter circuit for generating an alternating current (AC) control signal to control the AC element of the calibration signal in response to predetermined control signals; a second converter circuit for generating a first direct current (DC) control signal to control the DC element of the calibration signal in response to the control signals; a third converter circuit for generating a second DC control signal to control the DC element of the calibration signal in response to the control signals; and a calibration signal generation circuit for generating the calibration signal in response to the AC, first DC and second DC control signals.

According to an aspect of the preferred embodiment of the invention, current values of the first and second DC control signals are controlled in response to the control signals, and the first and second DC control signals are summed and applied to the calibration signal generation circuit. Preferably, the control signals are Inter IC Communication signals (hereinafter "I2C signals") generated from the predetermined microcomputer.

According to another preferred embodiment of the invention, a processor for generating a calibration signal to control the horizontal signal of a monitor comprises a first converter circuit, a second converter circuit, a third converter circuit, and a calibration signal generation circuit.

Here, the first converter circuit generates an AC control signal to control the AC element of the calibration signal in response to predetermined control signals. The second converter circuit generates a first DC control signal to control the DC element of the calibration signal in response to the control signals. The third converter circuit generates a second DC control signal to control the DC element of the calibration signal in response to the control signals. The calibration signal generation circuit generates the calibration signal in response to the AC, first DC, and second DC control signals.

As in the first embodiment of the invention, current values of the first and second DC control signals are controlled in response to the control signals, and the first and second DC control signals are summed up to be applied to the calibration signal generation circuit. The control signals are I2C signals generated from the predetermined microcomputer.

As a result, the processor for controlling the horizontal size of the monitor screen and a system thereof, according to the present invention, control the horizontal size of the monitor screen, remaining not affected by microcomputer generated noise.

BRIEF DESCRIPTION OF THE DRAWINGS

The embodiments of the present invention will become more apparent by descriptions of the preferred embodiments thereof with reference to the attached drawings in which.

DETAILED DESCRIPTION OF PREFERRED EMBODIMENTS

Figure 1:
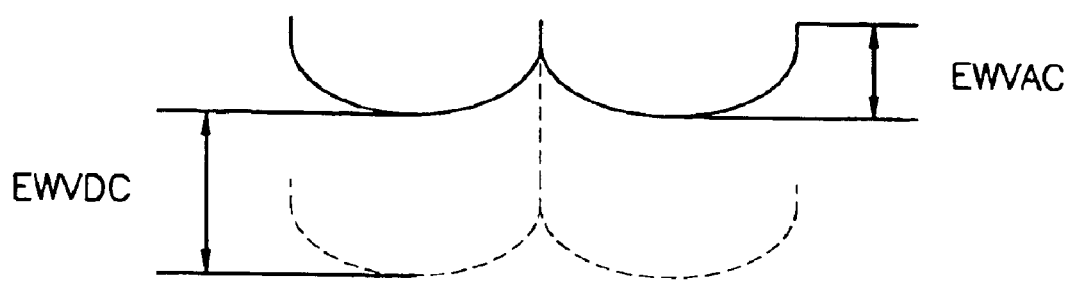
FIG. 1 illustrates a horizontal calibration signal.
Figure 2:
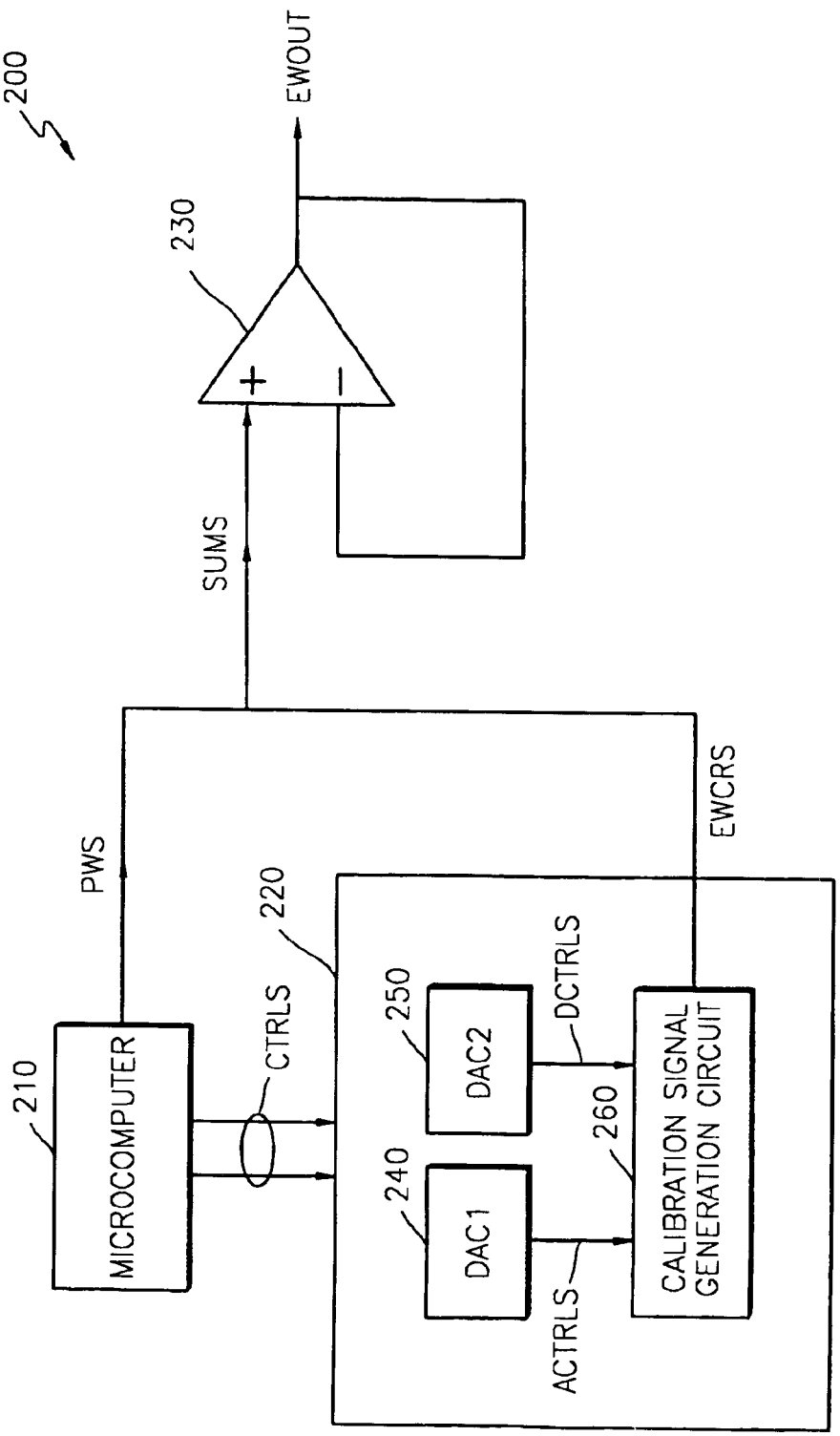
FIG. 2 is a block diagram illustrating a conventional system for controlling the horizontal size of a monitor screen.

In preferred embodiments of the present invention, the same reference numerals in different drawings represent the same element, and thus their description in consequent drawings is omitted.

Figure 3:
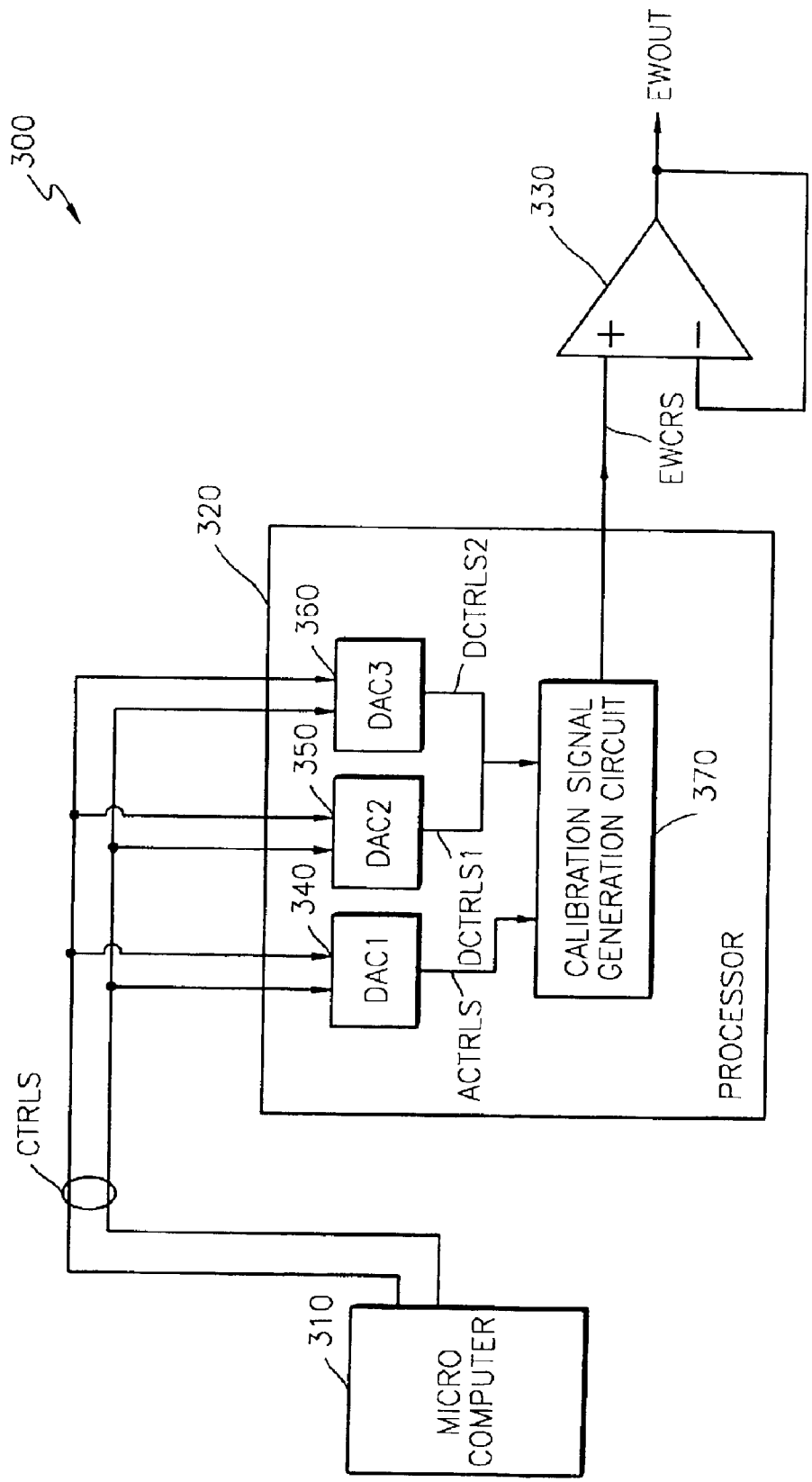
FIG. 3 is a block diagram illustrating a system for controlling the horizontal size of a monitor screen according to an embodiment of the present invention.

FIG. 3 is a block diagram of an embodiment of the present invention illustrating a system for controlling the horizontal size of a monitor screen. Referring to FIG. 3, the system 300 for controlling the horizontal size of the monitor screen comprises a processor 320, a driving circuit 330 and a microcomputer 310. The processor 320 generates a calibration signal EWCRS for controlling the horizontal size of the monitor screen, in response to predetermined control signals CTRLS.

More specifically, the processor 320 comprises a first converter circuit 340, a second converter circuit 350, a third converter circuit 360, and a calibration signal generation circuit 370.

The first converter circuit 340 generates an alternating current (AC) control signal ACTRLS in response to the predetermined control signals CTRLS for controlling the AC element of the calibration signal EWCRS. The second converter circuit 350 generates a first direct current (DC) control signal DCTRLS1 in response to the control signals CTRLS for controlling the DC element of the calibration signal EWCRS. The third converter circuit 360 generates a second DC control signal DCTRLS2 in response to the control signals CTRLS for controlling the DC element of the calibration signal EWCRS. The calibration signal generation circuit 370 generates the calibration signal EWCRS in response to the AC, first DC and second DC control signals ACTRLS, DCTRLS1, and DCTRLS2, respectively.

In particular, the control signals CTRLS are I2C signals, which are generated from the microcomputer 310. Current levels of the first and second DC control signals DCTRLS1 and DCTRLS2 are controlled in response to the control signals CTRLS, and the first and second DC control signals DCTRLS1 and DCTRLS2 are summed up to be applied to the calibration signal generation circuit 370. The driving circuit 320 receives the calibration signal EWCRS and outputs a horizontal calibration signal EWOUT after controlling the driving capacity of the calibration signal EWCRS in accordance with an external load. The microcomputer 310 generates the control signals CTRLS.

The operation of the system for controlling the horizontal size of the monitor screen according to the preferred embodiment of the present invention is more fully described with reference to FIG. 3. The I2C signals used in a cathode ray tube (CRT) monitor are generated from the microcomputer 310 as control signals CTRLS. Because those skilled in the art fully understand the I2C signals, their detailed description is omitted. The I2C signals are composed of two bits of signals, a data signal and a clock signal. The control signals CTRLS are applied to the converters 340, 350, and 360 in the processor 320 for controlling current levels of the AC, the first DC, and the second DC control signals ACTRLS, DCTRLS1, and DCTRLS2, respectively, which are generated from the converters 340, 350, and 360, respectively.

A user externally controls the control signals CTRLS, thereby affecting the third converter 360 in the processor 320 for controlling the current amount of the second DC control signal DCTRLS2 generated from the third converter 360. In other words, the data signal of the control signals CTRLS contains information on controlling the first through third converters 340, 350, and 360. In this case, information on controlling the first and second converters 340 and 350 has been set and stored in the microcomputer 310 when the monitors are manufactured in a factory, and information on controlling the third converter 360 is set to control the horizontal size of the monitor screen by a user.

When the user controls the horizontal size of the monitor screen by manipulating a switch while watching the screen of the monitor, a specific signal generated from the switch controls information on controlling the third converter 360 of the processor 320. The processor 320 generates the calibration signal EWCRS for the horizontal calibration. The calibration signal EWCRS performs a keystone adjustment and an amplitude adjustment as occasionally demanded. The adjustments are performed by the control signals CTRLS generated from the microcomputer 310. The calibration signal EWCRS generated from the processor 320 controls the horizontal size of the screen by using the DC voltage value of the calibration signal EWCRS.

The second and the third converters 350 and 360 in the processor 320 control the DC voltage value of the calibration signal EWCRS. The control signals CTRLS generated from the microcomputer 310 control current levels of the first and the second DC control signals DCTRLS1 and DCTRLS2. In other words, the data signal of the control signals CTRLS contains information on controlling current levels of the first and second DC control signals DCTRLS1 and DCTRLS2. If current values of the first and the second DC control signals DCTRLS1 and DCTRLS2 are adjusted by controlling the second and third converters 350 and 360, the DC voltage value of the calibration signal EWCRS is also controlled, and thereby the horizontal size of the screen is adjusted in accordance with the DC voltage value of the calibration signal EWCRS. In particular, the user can control the current value of the second DC control signal DCTRLS2 while watching the screen of the monitor.

The first and the second DC control signals DCTRLS1 and DCTRLS2 are summed up and applied to the calibration signal generation circuit 370. The calibration signal generation circuit 370 receives the AC, the first DC, and the second DC control signals ACTRLS, DCTRLS1, and DCTRLS2, respectively for generating the calibration signal EWCRS. Because those skilled in the art fully understand the structure of the calibration signal generation circuit 370, its description is omitted.

The second and the third converters 350 and 360 may be designed to have different current generation capacities if necessary. For example, the second converter 350 may be designed for generating a current value twice as much as the current value generated from the third converter 360. The driving circuit 330 lets the calibration signal EWCRS have a driving capacity in terms of the load connected to a next terminal. According to a preferred embodiment of the present invention, the PWM port of the microcomputer 310 does not generate the DC voltage, so that only the processor 320, which is controlled by the microcomputer 310, controls the horizontal size of the screen. Consequently, the noise generated from the microcomputer 310 does not affect the calibration signal EWCRS.

A processor 320 according to another embodiment of the present invention comprises a first converter circuit 340, a second converter circuit 350, a third converter circuit 360 and a calibration signal generation circuit 370. The first converter circuit 340 generates an AC control signal ACTRLS in response to predetermined control signals CTRLS for controlling the AC element of a calibration signal EWCRS. The second converter circuit 350 generates a first DC control signal DCTRLS1 in response to the control signals CTRLS for controlling the DC element of the calibration signal EWCRS. The third converter circuit 360 generates a second DC control signal DCTRLS2 in response to the control signals CTRLS for controlling the DC element of the calibration signal EWCRS.

Current levels of the first and second DC control signals DCTRLS1 and DCTRLS2 are controlled in response to the control signals CTRLS, and the first and second DC control signals DCTRLS1 and DCTRLS2 are summed up to be applied to the calibration signal generation circuit 370. In particular, the control signals CTRLS are I2C signals generated from a microcomputer 310. The calibration signal generation circuit 370 generates the calibration signal EWCRS in response to the AC, the first DC, and the second DC control signals ACTRLS, DCTRLS1, and DCTRLS2, respectively.

The processor 320 is another embodiment of the present invention. The operation of the processor 320 is the same as the system 300 according to the previous embodiment of the present invention, except for the microcomputer 310 and a driving circuit 330. Consequently, the operation of the processor 320 according to another embodiment of the present invention will be understood by those skilled in the art.

As a result, the processor for controlling the horizontal size of the monitor and system thereof according to the present invention control the horizontal size of the monitor screen, remaining not affected by the microcomputer generated noise.

While this invention has been particularly shown and described with reference to preferred embodiments thereof, the preferred embodiments described above are merely illustrative and are not intended to limit the scope of the invention. It will be understood by those skilled in the art that various changes in form and details may be made therein without departing from the spirit and scope of the invention as defined by the appended claims.

What is claimed is:

1. A system for controlling the horizontal size of a monitor screen, the system comprising:
    a processor for generating a calibration signal for controlling the horizontal size of a monitor screen, in response to predetermined control signals;
    a driving circuit for receiving the calibration signal, controlling the calibration signal to have the driving capacity according to an external load, and outputting a controlled calibration signal; and
    a microcomputer for generating an alternating current (AC) control signal, a first direct current (DC) control signal, and a second DC control signal.

2. The system for controlling the horizontal size of the monitor screen of claim 1, the processor further comprising:
    a first converter circuit for generating an alternating current (AC) control signal to control an AC element of the calibration signal in response to predetermined control signals;
    a second converter circuit for generating a first direct current (DC) control signal to control a DC element of the calibration signal in response to the control signals;
    a third converter circuit for generating a second DC control signal to control the DC element of the calibration signal in response to the control signals; and
    a calibration signal generation circuit for generating the calibration signal in response to the AC, first DC and second DC control signals.

3. The system for controlling the horizontal size of the monitor screen of claim 2, wherein the second and the third converter circuits generate a different current value from each other.

4. The system for controlling the horizontal size of the monitor screen of claim 2, wherein current values of the first and the second DC control signals are controlled in response to the control signals.

5. The system for controlling the horizontal size of the monitor screen of claim 2, wherein the first and the second DC control signals are summed and applied to the calibration signal generation circuit.

6. The system for controlling the horizontal size of the monitor screen of claim 2, wherein the control signals are I2C signals generated from the predetermined microcomputer.

7. A processor for generating a calibration signal for controlling the horizontal signal of a monitor screen, the processor comprising:
    a first converter circuit for generating an AC control signal to control an AC element of the calibration signal in response to predetermined control signals generated at a microcomputer;
    second converter circuit for generating a first DC control signal to control a DC element of the calibration signal in response to the control signals;
    a third converter circuit for generating a second DC control signal to control the DC element of the calibration signal in response to the control signals; and
    a calibration signal generation circuit for generating the calibration signal in response to the AC, first DC and second DC control signals.

8. The processor of claim 7, wherein the second and the third converter circuits generate a different current value from another.

9. The processor of claim 7, wherein current values of the first and the second DC control signals are controlled in response to the control signals.

10. The processor of claim 9, wherein the first and the second DC control signals are summed up to be applied to the calibration signal generation circuit.

11. The processor of claim 7, wherein the control signals are I2C signals.

12. A method for controlling the horizontal signal of a monitor screen comprising the steps of:
    generating an alternating current (AC) control signal to control an AC element of the calibration signal in response to predetermined control signals generated at a microcomputer;

generating a first direct current (DC) control signal to control a DC element of the calibration signal in response to the control signals;

generating a second DC control signal to control the DC element of the calibration signal in response to the control signals; and generating the calibration signal in response to the AC, first DC and second DC control signals.

13. The method of claim 12, further comprising controlling current values of the first and the second DC control signals in response to the control signals.

14. The method of claim 13, further comprising summing up the first and the second DC control signals to apply to the calibration signal generation circuit.

15. The method of claim 14, further comprising the steps of:

receiving a calibration signal from the calibration signal generation circuit;

controlling the driving capacity of the calibration signal according to an external load; and outputting the calibration signal.

* * * * *